United States Patent
Dias et al.

(10) Patent No.: US 11,567,807 B2
(45) Date of Patent: Jan. 31, 2023

(54) ALLOCATION OF SHARED COMPUTING RESOURCES USING SOURCE CODE FEATURE EXTRACTION AND MACHINE LEARNING

(71) Applicant: EMC IP Holding Company LLC, Hopkinton, MA (US)

(72) Inventors: Jonas F. Dias, Rio de Janeiro (BR); Tiago Salviano Calmon, Rio de Janeiro (BR); Adriana Bechara Prado, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 1259 days.

(21) Appl. No.: 15/941,434

(22) Filed: Mar. 30, 2018

(65) Prior Publication Data

US 2019/0303211 A1 Oct. 3, 2019

(51) Int. Cl.
*G06F 9/50* (2006.01)
*H04L 47/70* (2022.01)
(Continued)

(52) U.S. Cl.
CPC .......... *G06F 9/5077* (2013.01); *G06F 8/433* (2013.01); *G06F 40/40* (2020.01); *G06N 20/00* (2019.01);
(Continued)

(58) Field of Classification Search
CPC .......... G06F 8/43; G06F 9/5077; G06F 40/40; G06N 20/00; H04L 47/2425; H04L 47/823
See application file for complete search history.

(56) References Cited

U.S. PATENT DOCUMENTS 10,269,029 B1 * 4/2019 Evans ................ G06Q 30/0201
10,817,604 B1 10/2020 Kimball et al.
(Continued)

OTHER PUBLICATIONS

T. Gillis, "Cost Wars: Data Center vs. Public Cloud," Forbes Media LLC, Sep. 2, 2015. [Online]. Available: https://www.forbes.com/sites/tomgillis/2015/09/02/cost-wars-data-center-vs-public-cloud/#492fbe78923f. [Accessed Dec. 18, 2017].
(Continued)

*Primary Examiner* — Jeong S Park
(74) *Attorney, Agent, or Firm* — Ryan, Mason & Lewis, LLP

(57) ABSTRACT

Techniques are provided for allocation of shared computing resources using source code feature extraction and machine learning techniques. An exemplary method comprises obtaining source code for execution in a shared computing environment; extracting a plurality of discriminative features from the source code; obtaining a trained machine learning model; and generating a prediction of an allocation of one or more resources of the shared computing environment needed to satisfy one or more service level agreement requirements for the source code. The generated prediction is optionally adjusted using a statistical analysis of an error curve, based on one or more error boundaries obtained by the trained machine learning model. The trained machine learning model can be trained using a set of discriminative features extracted from training source code and corresponding measurements of metrics of the service level agreement requirements obtained by executing the training source code on a plurality of the resources of the shared computing environment.

20 Claims, 8 Drawing Sheets

(51) Int. Cl.
*G06F 8/41* (2018.01)
*H04L 47/2425* (2022.01)
*G06N 20/00* (2019.01)
*G06F 40/40* (2020.01)

(52) U.S. Cl.
CPC ........ *H04L 47/2425* (2013.01); *H04L 47/823* (2013.01)

(56) References Cited

U.S. PATENT DOCUMENTS

| | | | |
|---|---|---|---|
| 2009/0180430 A1 | 7/2009 | Fadell | |
| 2009/0307699 A1* | 12/2009 | Munshi | G06F 9/44 718/102 |
| 2012/0330711 A1 | 12/2012 | Jain et al. | |
| 2014/0379619 A1 | 12/2014 | Permeh et al. | |
| 2015/0006734 A1 | 1/2015 | Parikh et al. | |
| 2016/0021024 A1 | 1/2016 | Parikh | |
| 2016/0217390 A1 | 7/2016 | Shoaib et al. | |
| 2016/0359668 A1 | 12/2016 | Udupi et al. | |
| 2018/0157743 A1 | 6/2018 | Hori et al. | |
| 2018/0276562 A1* | 9/2018 | Woulfe | G06N 3/0445 |
| 2018/0302340 A1* | 10/2018 | Alvarez Callau | H04L 47/821 |
| 2019/0034227 A1 | 1/2019 | Suman et al. | |
| 2019/0079741 A1* | 3/2019 | Makkar | G06F 8/33 |
| 2019/0079796 A1* | 3/2019 | Asahara | G06F 9/4881 |
| 2019/0102693 A1* | 4/2019 | Yates | G06N 5/003 |
| 2019/0108001 A1* | 4/2019 | Hauser | G06F 11/3668 |
| 2019/0130327 A1* | 5/2019 | Carpenter | G06F 9/45558 |

OTHER PUBLICATIONS

Wilhelm et al., "The worst-case execution-time problem—overview of methods and survey of tools," ACM Transactions on Embedded Computing Systems, vol. 7, No. 3, p. 36, Apr. 1, 2008.
Kagdi et al., "Comparing approaches to mining source code for call-usage patterns," in Proceedings of the Fourth International Workshop on Mining Software Repositories, 2007.
Allamanis et al., "Mining source code repositories at massive scale using language modeling," in Proceedings of the 10th Working Conference on Mining Software Repositories, 2013.
Betts et al., "Estimating the WCET of GPU-accelerated applications using hybrid analysis," in 25th Euromicro Conference on Real-Time Systems (ECRTS), 2013.
Wikipedia contributors, "Newsvendor model," [Online]. Available: https://en.wikipedia.org/wiki/Newsvendor_model. [Accessed Sep. 21, 2017].
J. MacQueen,"Some methods for classification and analysis of multivariate observations.," Proceedings of the Fifth Berkeley Symposium on Mathematical Statistics and Probability, vol. 1, pp. 281-297.
Dong et al., "Efficient mining of emerging patterns: Discovering trends and differences," in Proceedings of the ACM SIGKDD, 1999.
G. D. Z. W. Li, "CAEP: Classification by Aggregating Emerging Patterns," in International Conference on Discovery Science, 1999.
U.S. Appl. No. 16/039,743 entitled, "Allocation of Shared Computing Resources Using Source Code Feature Extraction and Clustering-Based Training of Machine Learning Models", filed Jul. 19, 2018.

* cited by examiner

ALLOCATION OF SHARED COMPUTING RESOURCES USING SOURCE CODE FEATURE EXTRACTION AND MACHINE LEARNING

FIELD

The field relates generally to resource allocation techniques for a shared computing environment.

BACKGROUND

Recently, shared computing techniques (such as cloud computing techniques) have become a prominent model for business computation. Among other benefits of shared computing, companies, as well as end users, only pay for their usage, without a substantial initial investment, by scaling shared computing resources according to their needs.

Virtualization is an important technology behind cloud computing. Infrastructure providers rely on virtualization to support their business models, as virtualization enables an abstraction of the available resources as virtual components. To efficiently manage these resources, infrastructure providers need efficient scheduling algorithms and good resource allocation policies. Furthermore, infrastructure providers often need to guarantee service level agreements (SLAs) entered with their customers.

Infrastructure providers, however, also need to minimize their management costs as much as possible. Thus, infrastructure providers do not want to be overly conservative in their resource allocation policies to avoid SLA infringement. Allocating more resources than the needs of a given customer will likely result in increased costs, which might lead to reduced profits or competitiveness.

A need therefore exists for improved techniques for allocation of shared computing resources.

SUMMARY

Illustrative embodiments of the present disclosure provide for allocation of shared computing resources using source code feature extraction and machine learning techniques. In one embodiment, an exemplary method comprises: obtaining source code for execution in a shared computing environment; extracting a plurality of discriminative features from the source code; obtaining a trained machine learning model; and generating a prediction of an allocation of one or more resources of the shared computing environment needed to satisfy one or more service level agreement requirements for the source code. The generated prediction is optionally adjusted using a statistical analysis of an error curve, based on one or more error boundaries obtained by the trained machine learning model.

In some embodiments, the trained machine learning model is trained using a set of discriminative features extracted from training source code and corresponding measurements of one or more metrics of the service level agreement requirements obtained by executing the training source code on a plurality of the resources of the shared computing environment.

In one or more embodiments, the discriminative features are extracted from the source code and/or from the training source code using, for example, natural language processing techniques, pattern-based techniques and/or worst-case execution time techniques.

Other illustrative embodiments include, without limitation, apparatus, systems, methods and computer program products comprising processor-readable storage media.

DETAILED DESCRIPTION

Figure 1:
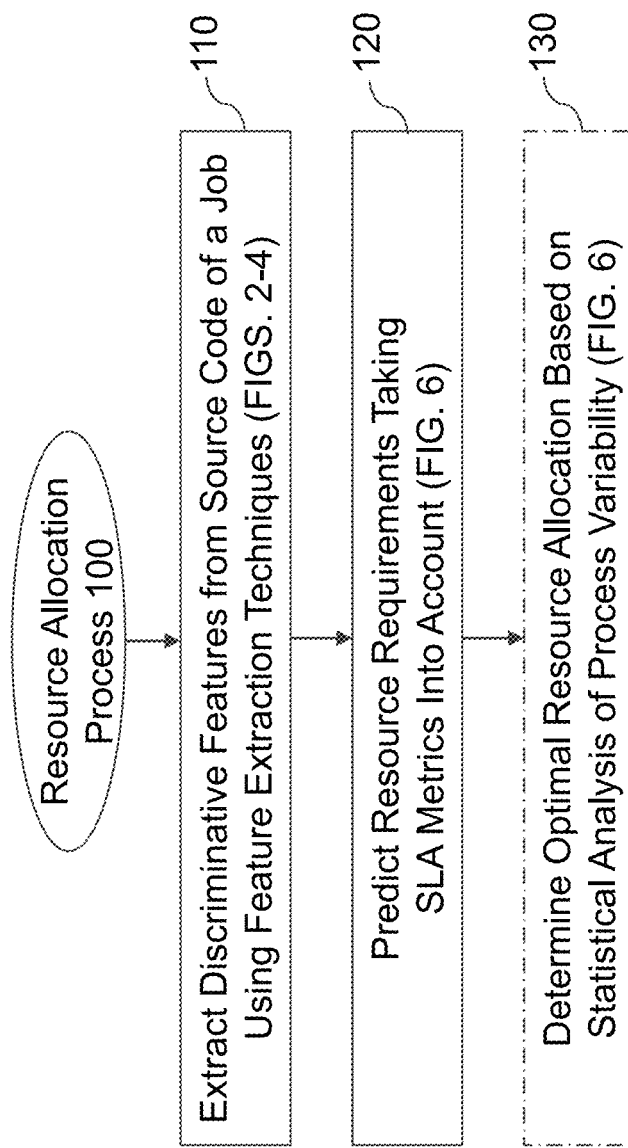
FIG. 1 is a flow chart illustrating an exemplary implementation of a resource allocation process, according to one embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for allocation of shared computing resources using source code feature extraction and machine learning techniques.

As noted above, infrastructure providers often need to guarantee service level agreements (SLAs) (e.g., specified quality metrics) entered with their customers. One commonly used SLA is response time (also referred to as execution time). In serverless computing, for example, the user and the provider agree on a monetary amount to be paid by the user for the execution of a piece of software code by the provider. The software code is executed and the results must be returned before the specified time. The user must then pay for the service. If the execution time violates the SLA, the provider must often pay a penalty.

Optimal resource allocation is an NP-Hard (non-deterministic polynomial-time hard) problem. To properly allocate resources, e.g., using a heuristic, without infringing the agreed upon execution time, providers need a good estimate of how much time it will take to process the given piece of software code and its related input data until completion.

In one or more embodiments, a mechanism is provided for extracting discriminant features directly from source code.

These extracted features, coupled with measurements of one or more metrics of SLA requirements (SLA metrics, for short) in sample hardware infrastructures, allow the providers to obtain good estimates when new jobs arrive for execution. Examples of SLA requirements include execution time, accuracy of the results, resource availability, another specified quality metric, or any combination thereof. It is noted that a formal agreement or contract between the user and the service provider regarding the SLA is not required, as would be apparent to a person of ordinary skill in the art. It is assumed that an executable job is associated with: (1) an SLA, and (2) a source code to be executed in the shared infrastructure. The source code of the new executable job may be completely new (e.g., the source code may have never been executed before), and the system will still be able to produce an estimate.

The disclosed shared computing resource allocation techniques extract features from source code using three exemplary feature extraction techniques: pattern-based techniques (see, e.g., H. Kagdi, M. L. Collard and J. I. Maletic, "Comparing Approaches to Mining Source Code for Call-Usage Patterns," in *Proc. of the Fourth Int'l Workshop on Mining Software Repositories,* 2007); natural language processing techniques (see, e.g., M. Allamanis and C. Sutton, "Mining Source Code Repositories at Massive Scale Using Language Modeling," in *Proc. of the 10th Working Conf. on Mining Software Repositories,* 2013); and control flow graph analysis techniques (based on worst-case execution time literature) (see, e.g., A. Betts and A. Donaldson, "Estimating the WCET of GPU-Accelerated Applications Using Hybrid Analysis," in 25*th Euromicro Conf. on Real-Time Systems (ECRTS)*, 2013). The features are then used as input for one or more trained machine learning models, as discussed further below in conjunction with FIG. 6, which are able to predict source code behavior in shared computing infrastructures.

In some embodiments, in order to obtain the prediction models, techniques are provided to separate source code of executable jobs, which have already been executed before, into classes using clustering techniques. In addition, one or more machine learning models are trained to predict a required number of resources to finish the execution of a source code of an executable job which has never been executed before, on a given time frame, avoiding SLA violation. The prediction models can be trained based on the complete source code corpus as well as for each class of source code, as discussed further below in conjunction with FIG. 5. Based on such models, it is possible to adjust the resource allocation estimate, maximizing the expected profit of the service provider.

As noted above, optimal resource allocation is an NP-hard problem. Resource allocation becomes even more complicated on distributed and shared resources where a large number of variables influence the performance of the underlying infrastructure. When a new executable job arrives and the source code of the new executable job has never been executed before, the provisioning system must decide a proper resource allocation based on the source code of the executable job, the corresponding input data and the infrastructure current state. This situation poses a set of challenges, introduced hereinafter.

If the source code of the executable job has never been executed, it is hard to know how the source code of the executable job impacts the system load. The execution of the source code of the job may be CPU (central processing unit) bound or I/O (input/output) bound, for example. The execution of the source code of the job may also load a lot of data in memory. It is complicated to parse the source code of the job and to decide which class the source code of that given job belongs. Thus, there is a need for a set of tools and heuristics to extract relevant information from source code and use learn-by-example strategies to discover how to classify a given source code of a given job.

It is also a problem to define how many resources are required to complete the execution of an arbitrary source code of a job in a specified time, such as a set of hours. This is a consequence of the level of entropy of a distributed computer system. There are typically too many hardware particularities, compiler optimizations and operating system policies, for example, that affect the performance. Thus, it is often necessary to understand how particular patterns and other features of the source code are associated with their performance on the available hardware.

Further, if the resource allocation policy is too conservative, the resource allocation policy might reserve too many assets to execute a given job. Although the resource allocation policy may guarantee that the SLA will not be violated, the resource allocation policy may also reduce the profit margins. Thus, an ideal resource allocation policy should reserve a substantially minimum set of resources that will still be able to finish the execution of a source code of a job within the terms of the SLA. However, this "sweet spot" may be too complicated to find with conventional techniques.

Resource Allocation Using Source Code Feature Extraction and Machine Learning

In some embodiments, the disclosed resource allocation techniques employ a fingerprint of the source code, which contains discriminative features regarding a given SLA metric, feeding the source code fingerprint through one or more pre-trained machine learning models and collecting the prediction of the amount of resources needed to execute a given source code respecting the SLA constraint.

An optional step is to adjust the aforementioned prediction using a utility function to maximize an expected profit. In at least one embodiment of this disclosure, this utility function is materialized by the generated profit.

One or more embodiments of the disclosure parse and analyze the source code to extract discriminant features from the source code. Based on these extracted characteristics, it is possible to have a better understanding of the underlying source code and to apply machine learning techniques to automatically recognize the corresponding fingerprint and predict their behavior under particular circumstances.

The features extracted from the source code of a job can be interpreted as a fingerprint of the source code (e.g., a potentially unique descriptor that identifies a source code entity). Although a complete fingerprint may be unique, the fingerprint may share characteristics with other fingerprints. Therefore, it is possible to use clustering techniques to group source code based on their fingerprints. In some embodiments, each cluster represents a class of source code of jobs that behave similarly, based on one or more predefined similarity criteria. The information about the source code class is important for the disclosed resource allocation algorithms.

In at least one embodiment, the features of source code of executable jobs that have already been executed on a given set of resources can be used as vectors of independent variables. Combined with the user restrictions, characteristics of the input data and the state of the computing resources, these vectors can be used as an input to train machine learning models, as discussed further below in conjunction with FIG. 5. The trained models can predict the value of the SLA metrics on the same set of resources. Alternatively, another model could predict the required amount of resources to execute the job without violating the SLA metrics.

Source code from different executable jobs may have very particular execution profiles. As their dissimilarities are identified using source code features to cluster them into meaningful groups, machine learning can be used to model the profile of the applications of each group. By creating a model for each group, in some embodiments, there is a better chance of obtaining more accurate predictions.

Resource allocation policies are usually conservative in order to avoid SLA violation. In other words, they often employ too much compute power or other resources to execute a job. Consequently, in serverless environments, they are also reducing the profit margin of the service provider. If representative machine learning models are available, their variability can be used to evaluate the behavior of the target variable (being predicted) as the input variables are modified. In this manner, the substantially best configuration can be obtained that will substantially maximize profit while preventing SLA violation.

FIG. 1 is a flow chart illustrating an exemplary implementation of a resource allocation process 100, according to one embodiment of the disclosure. As shown in FIG. 1, the exemplary resource allocation process 100 initially extracts discriminative features from the source code of an executable job during step 110, for example, using one or more feature extraction techniques. Thus, step 110 obtains discriminative features from the source code to be used as input to the machine learning models.

In one or more embodiments, the exemplary feature extraction techniques comprise one or more of natural language processing (NLP) techniques, as discussed further below in conjunction with FIG. 2, pattern-based techniques, as discussed further below in conjunction with FIG. 3, and/or worst-case execution time (WCET) techniques, as discussed further below in conjunction with FIG. 4. While the exemplary embodiments employ NLP, pattern-based and/or WCET techniques, additional feature extraction techniques may be employed, such as the those described in Y. Zhou, H. Cheng and J. Yu, "Graph Clustering Based on Structural/Attribute Similarities," Proc. of the Very Large Data Base Endowment 2(1), 715-29 (2009), incorporated by reference herein in its entirety.

Thereafter, the exemplary resource allocation process 100 predicts resource requirements during step 120, taking the SLA metrics into account, as discussed further below in conjunction with FIGS. 5 and 6. In this manner, the amount of resources required to execute a given job can be predicted, respecting the SLA metrics agreed to, for example, by contract and taking into account the features extracted during step 110 and measured times.

Finally, the exemplary resource allocation process 100 optionally determines a substantially optimal resource allocation during step 130, based on a statistical analysis of process variability, as discussed further below in conjunction with FIG. 6. Step 130 adjusts the prediction generated during step 120 using a statistical analysis of an error curve obtained by the machine learning model, as discussed below. Thus, the prediction, rather than being an actual value, can be considered a probabilistic distribution centered in the actual prediction but varying according to the error.

Natural Language Processing for Discriminative Feature Extraction

As noted above, one way to extract features can generally be categorized as the methods belonging to the field of Natural Language Processing (NLP). See, e.g., M. Allamanis and C. Sutton, "Mining Source Code Repositories at Massive Scale Using Language Modeling," Proc. of the 10th Working Conf. on Mining Software Repositories, 2013. While such NLP papers are often concerned with different goals, features extracted from source code, being in a parsed or in a raw string format, are related to a number of SLA metrics, particularly with execution time and memory sizing.

Among the NLP techniques, Term Frequency (TF) is particularly interesting to extract discriminative features from source code.

Figure 2:
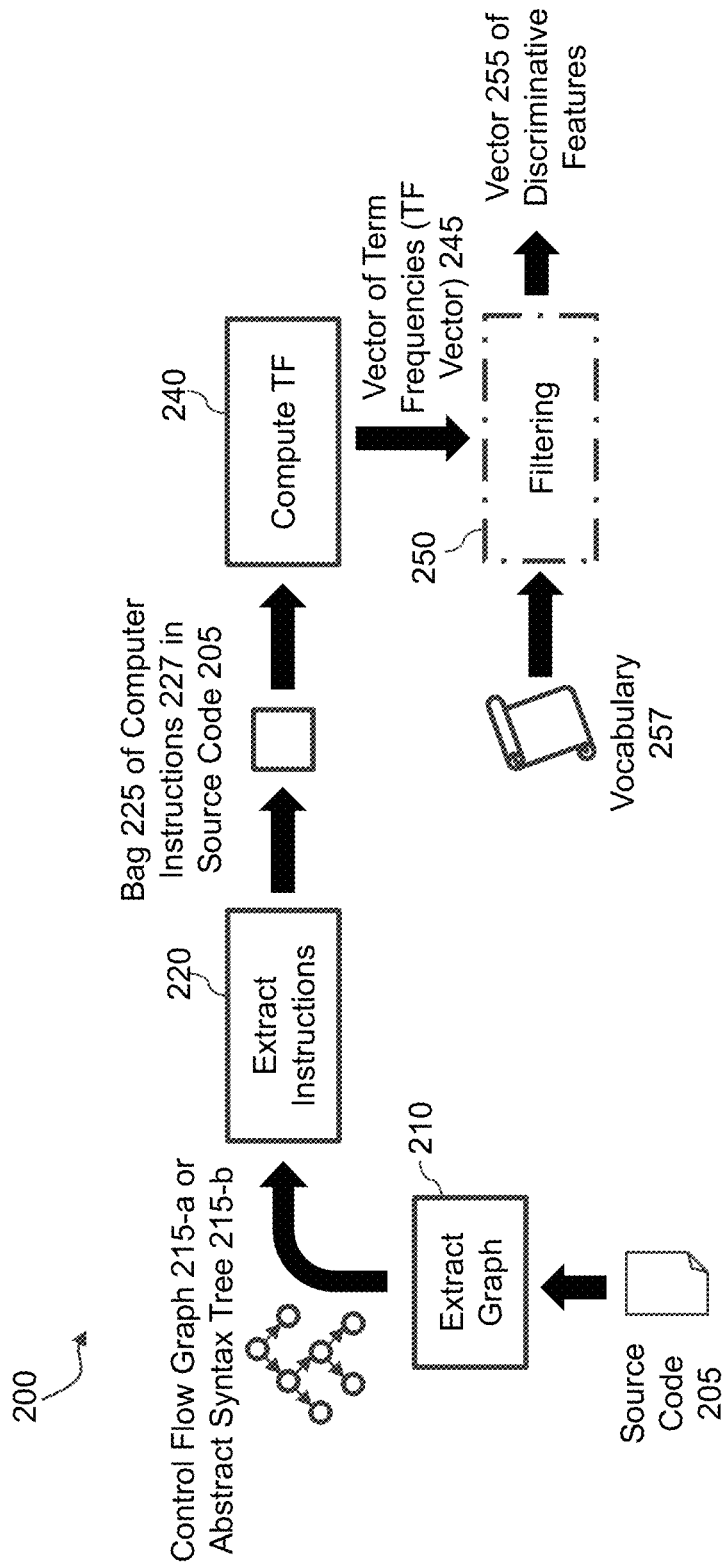
FIG. 2 is a flow chart illustrating an exemplary implementation of a natural language processing-based process for extracting discriminative features from a source code, according to at least one embodiment.

FIG. 2 is a flow chart illustrating an exemplary implementation of an NLP-based process 200 for extracting discriminative features from a source code, according to at least one embodiment of the disclosure.

As shown in FIG. 2, for the source code 205, the exemplary NLP-based process 200 initially automatically extracts the corresponding control flow graph (CFG) 215-a during step 210. Depending on the program language of the source code 205, a corresponding abstract syntax tree 215-b could be extracted alternatively, or as well.

The extracted CFG 215-a is then transformed into a bag 225 of computer instructions 227, during step 220, which may contain computer instructions 227 from internal libraries that are invoked by the original source code 205. Each computer instruction 227 is analogous to a term (word) in a text document. The term frequency (TF) of each computer instruction is measured during step 240, resulting in a vector of term frequencies (TF vector) 245.

During step 250, a subset of term frequencies in the TF vector 245 is then selected based on a predefined vocabulary 257, resulting in the vector 255 of discriminative features. Finally, the terms represented by the vector 255 are then the extracted discriminative features.

Discriminative Feature Extraction Based on Patterns

As noted above, another way to extract discriminative features is by using pattern mining related methods. Algorithms such as itemset mining and sequence mining can effectively be used to identify patterns in sequential function calls. See, e.g., H. Kagdi, M. L. Collard and J. I. Maletic, "Comparing Approaches to Mining Source Code for Call-Usage Patterns," Proc. of the Fourth Int'l Workshop on Mining Software Repositories, 2007. These patterns, coupled with other kinds of discriminative features, e.g., the input parameters of the corresponding source code of the job (e.g., number of iterations, desired image resolution of an output, the number of samples to be considered by any statistical analysis) directly relate to various SLA metrics.

Figure 3:
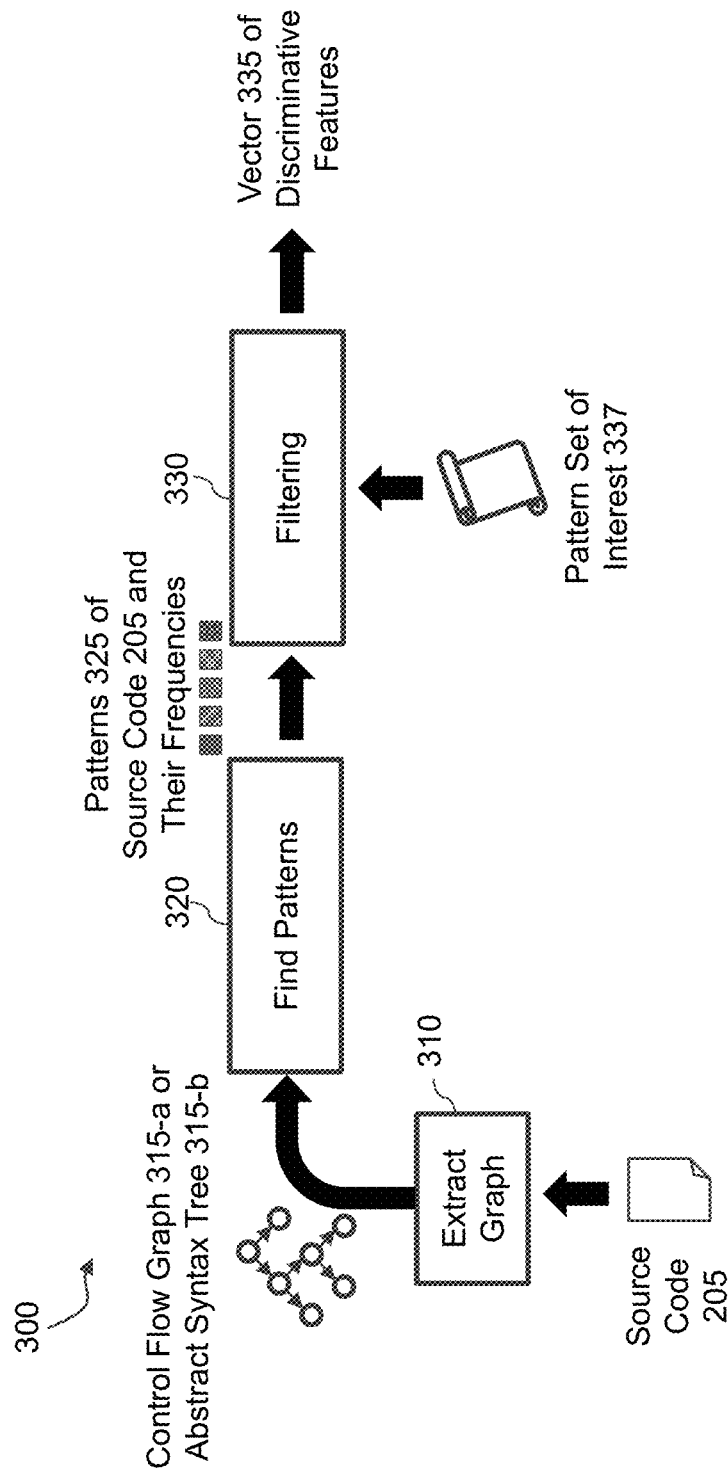
FIG. 3 is a flow chart illustrating an exemplary implementation of a pattern-based process for extracting discriminative features from a source code, according to an embodiment of the disclosure.

FIG. 3 is a flow chart illustrating an exemplary implementation of a pattern-based process 300 for extracting discriminative features from a source code, according to at least one embodiment of the disclosure.

As shown in FIG. 3, for the source code 205, its corresponding control flow graph 315-a and/or abstract syntax tree 315-b is automatically extracted during step 310, as with the exemplary NLP-based process 200 of FIG. 2.

Then, patterns 325 of the source code 205 along with their corresponding frequencies are extracted during step 320 from the control flow graph 315-a and/or abstract syntax tree 315-b.

The patterns 325 are then filtered, based on a predefined pattern set of interest 337, during step 330, to generate a vector 335 comprising a subset of patterns as discriminative features.

Worst-Case Execution Time for Discriminative Feature Extraction

As noted above, another way to extract discriminative features is by using Worst-Case Execution Time techniques. While much of the literature in this field addresses finding theoretical upper bounds to the time a program will execute given an infrastructure, much of the analysis can be used to extract features from a source code. The automatic extraction of the Control Flow Graph and of the Instrumentation Point Graph (IPG) detailed in A. Betts and A. Donaldson, "Estimating the WCET of GPU-Accelerated Applications Using Hybrid Analysis," in 25th *Euromicro Conf. on Real-Time Systems* (*ECRTS*), 2013, could be used as an input for WCET analysis, as well as for the methods described above, in order to generate features from a source code.

Figure 4:
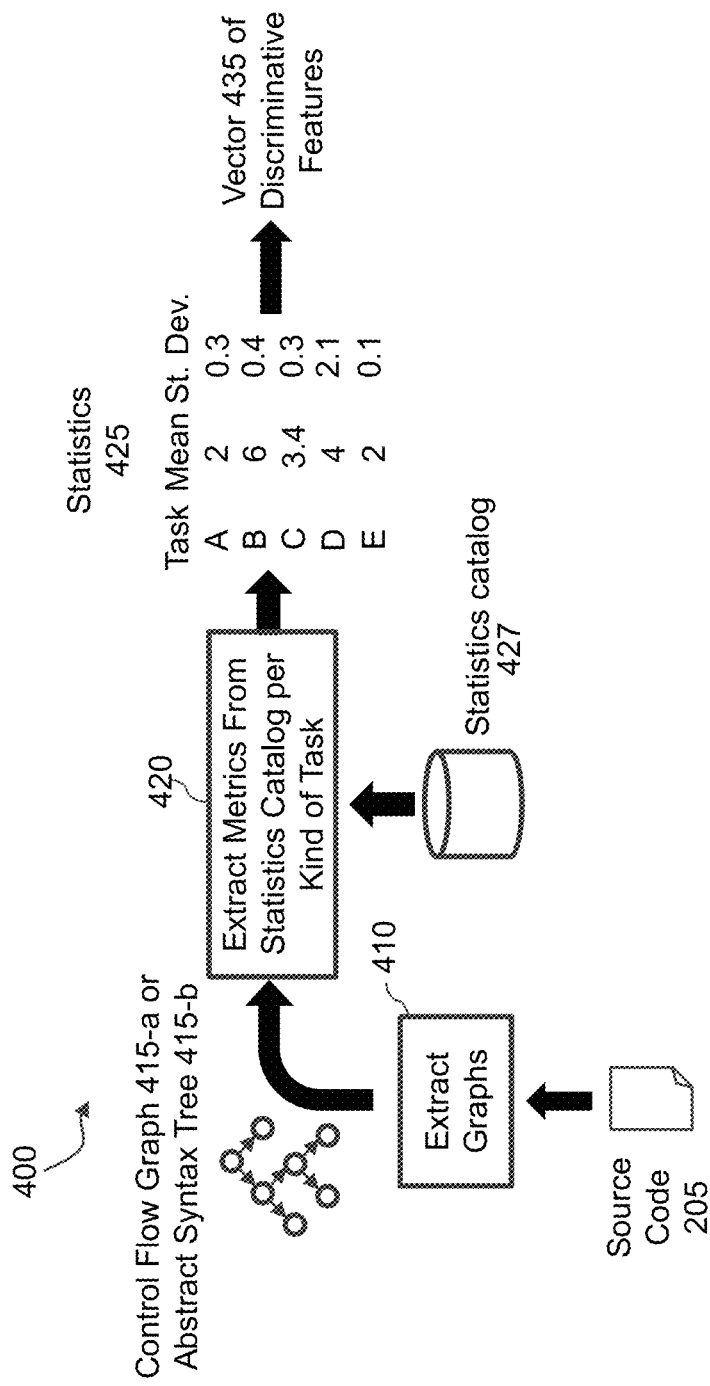
FIG. 4 is a flow chart illustrating an exemplary implementation of a worst-case execution time-based feature extraction process for extracting discriminative features from a source code, according to some embodiments.

FIG. 4 is a flow chart illustrating an exemplary implementation of a WCET-based feature extraction process 400 for extracting discriminative features from a source code, according to at least one embodiment of the disclosure.

As shown in FIG. 4, for the exemplary source code 205, the exemplary WCET-based feature extraction process 400 initially automatically extracts the corresponding control flow graph 415-*a* or abstract syntax tree 415-*b* during step 410, in a similar manner as the NLP-based process 200 of FIG. 2.

During step 420, the exemplary WCET-based feature extraction process 400 queries a statistics catalog 427 to extract statistics 425 from the statistics catalog 427 on execution times, for each kind of task in the CFG 415-*a*, such as statistics 425 (e.g., a mean and a standard deviation) for a plurality of exemplary tasks A through E.

A vector 435 is generated comprising a subset of discriminative features (e.g., statistics of the execution of parts of the exemplary CFG 415-*a*), based on the statistics 425.

One difference of the exemplary WCET-based feature extraction process 400, relative to previous techniques, is that the exemplary WCET-based feature extraction process 400 analyzes the exemplary CFG 415-*a* and associated statistics 425 for each type of task. This characteristic can help to generate more granular time representations to be further used by another algorithm, which might range from additive algorithms to machine learning. In this WCET-based embodiment, such discriminative features can optionally be combined with the discriminative features generated by the NLP and/or pattern-based techniques of FIGS. 2 and 3, respectively.

It is important to note that the features generated by each of the processes 200, 300, 400 of FIGS. 2 through 4, respectively, are complimentary in terms of explaining the behavior of the execution of the job associated with the source code. Therefore, it is encouraged, even though not necessary, that the machine learning models are trained with the maximum number of possible discriminative features. These aspects enhance the flexibility of the disclosed techniques for resource allocation by having multiple levels of performance depending on the training effort.

Predict Resource Requirements Taking SLA Metrics into Account

As noted above, the exemplary resource allocation process 100 of FIG. 1 predicts the amount of resources required to execute a given source code of a job, respecting one or more SLA metrics agreed to, for example, by contract during step 120. To do so, the disclosed resource allocation techniques take into account the discriminative features extracted during step 110 and the measured execution times.

Figure 5:
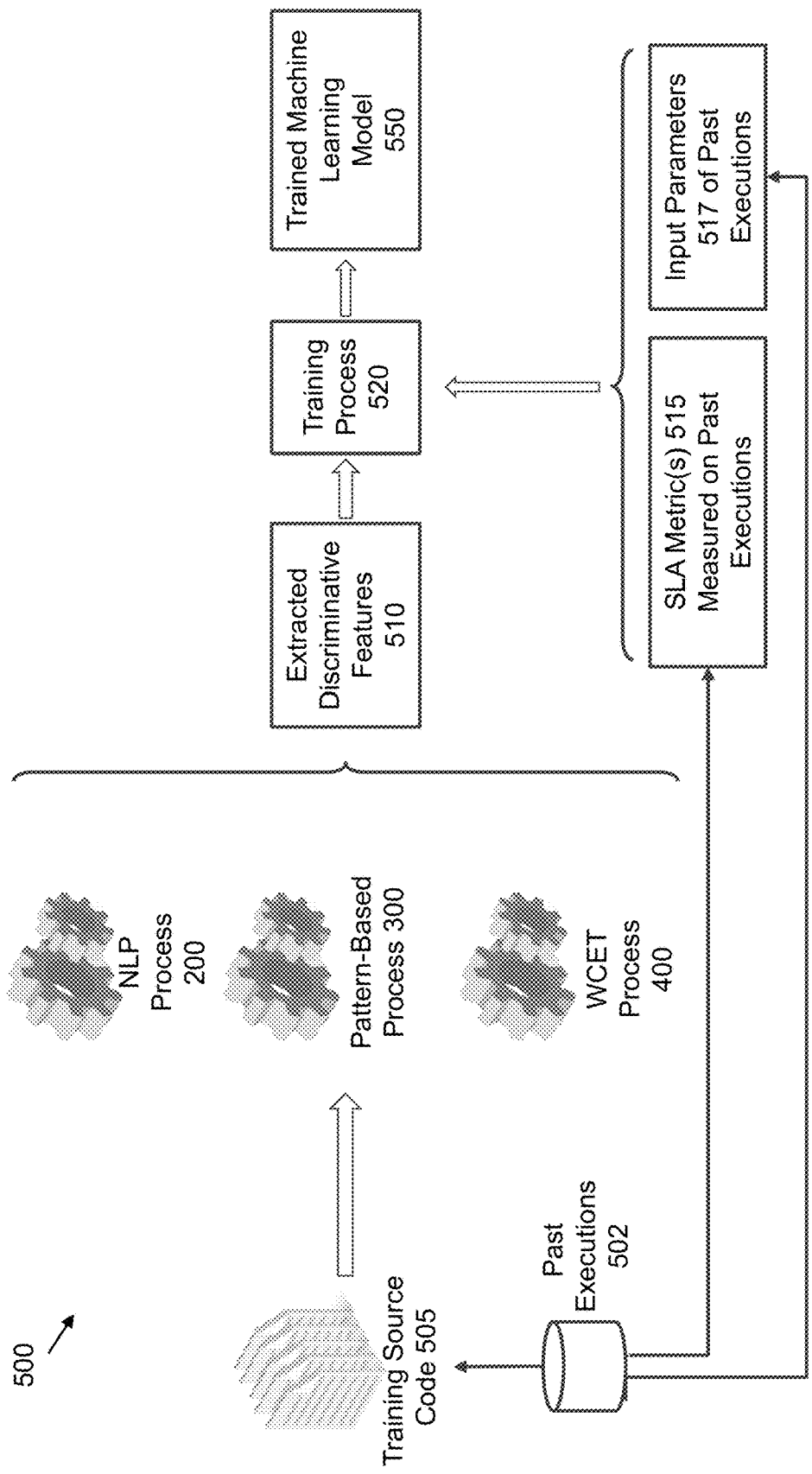
FIG. 5 is a flow chart illustrating an exemplary implementation of a machine learning model training process that trains one or more machine learning models from multiple sources of discriminative features, according to an embodiment.

FIG. 5 is a flow chart illustrating an exemplary implementation of a machine learning model training process 500 that trains one or more machine learning models from multiple sources of discriminative features, according to an embodiment. In the exemplary embodiment of FIG. 5, the machine learning model training is done directly by gathering all features and training a single machine learning model.

As shown in FIG. 5, exemplary sources of discriminative features for the training comprise a set of discriminative features 510 extracted from training source code 505 whose associated jobs have already been executed and available, for example, as a set of past executions 502. The feature extraction can be performed using one or more of, for example, the NLP-based process 200, the pattern-based process 300 and the WCET-based feature extraction process 400 of FIGS. 2 through 4, respectively.

As shown in FIG. 5, the extracted discriminative features 510, as well as the one or more SLA metrics 515 measured on the past executions 502 (as discussed above), and the input parameters 517 of the past executions 502 of the training source code 505, are used to train a machine learning model 550 in the embodiment of FIG. 5, using a training process 520, in a known manner. The input parameters 517 of the past executions 502 of the training source code 505 are associated with the inputs of a given training source code 505 (e.g., number of samples, number of iterations, and desired output quality). Generally, the measurements of the SLA metrics 515 are associated with the outputs of the past executions 502 of the training source code 505, while the input parameters 517 are associated with the inputs of the past executions 502 of the training source code 505.

For a more detailed discussion of the training of machine learning models, see, for example, Alice Zheng, "Evaluating Machine Learning Models: A Beginner's Guide to Key Concepts and Pitfalls," (2015), incorporated by reference herein in its entirety.

In further variations, an unsupervised learning technique can be employed directly at the extracted discriminative features 510 to group them into similar feature sets. Thereafter, a different machine learning model is trained for each of these sets of similar features.

Optimal Resource Allocation Based on Statistical Analysis

As noted above, the exemplary resource allocation process 100 optionally determines a substantially optimal resource allocation during step 130, based on a statistical analysis of process variability. Generally, step 130 adjusts the prediction generated during step 120 using a statistical analysis of an error curve obtained by the machine learning model, as discussed below. Thus, the prediction, rather than being an actual value, can be considered a probabilistic distribution centered in the actual prediction but varying according to the error.

Figure 6:
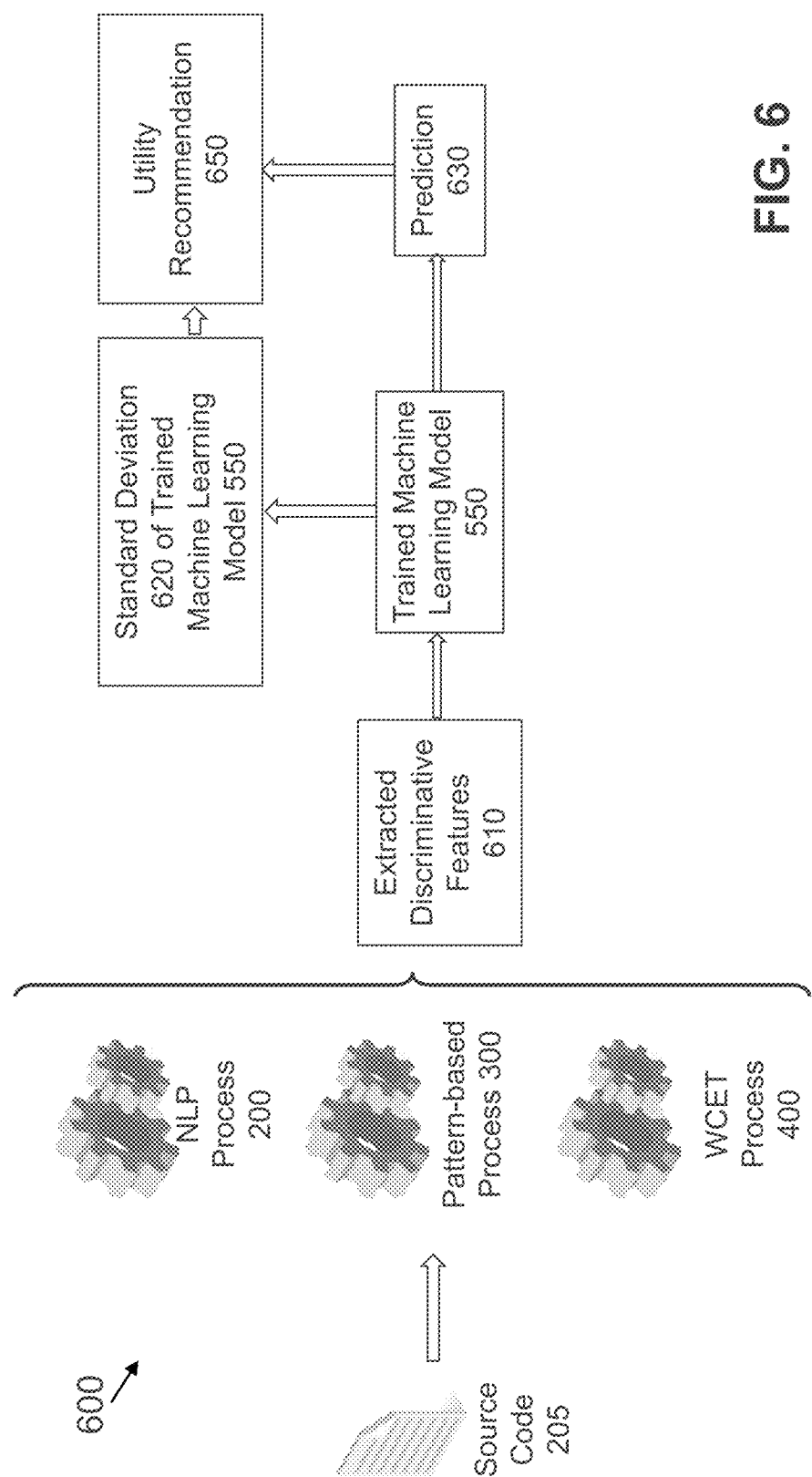
FIG. 6 is a flow chart illustrating an exemplary implementation of a resource allocation recommendation process, according to one embodiment.

FIG. 6 is a flow chart illustrating an exemplary implementation of a resource allocation recommendation process 600, according to one embodiment. As shown in FIG. 6, the exemplary sources of discriminative features for the resource allocation recommendation process 600 of FIG. 6 comprise a set of discriminative features 610 extracted from the source code 205 to be executed in the shared computing environment, for example, using one or more of the NLP-based process 200, the pattern-based process 300 and the WCET-based feature extraction process 400 of FIGS. 2 through 4, respectively, in a similar manner as the training process 500 of FIG. 5. The extracted discriminative features 610 serve as input to the trained machine learning model(s) 550 of FIG. 5.

The exemplary trained machine learning model 550 generates one or more current predictions 630 of an allocation of resources of the shared computing environment that are needed to satisfy one or more specified SLA requirements between the user and the service provider of the shared computing environment, as described above. The exemplary resource allocation recommendation process 600 optionally augments the current predictions 630 with one or more error boundaries (e.g., a "slack"), based on a standard deviation 620 of the trained machine learning model 550, to produce an augmented prediction comprising a substantially optimal utility recommendation 650.

With this new augmented prediction and a given utility function, it is possible to calculate the resource allocation that substantially maximizes an expected utility. One of the most used utility functions in Cloud Services business models is a hard SLA metric constraint. In at least one embodiment, the utility function is the hard threshold and the error can be modeled as a Gaussian curve. If that is the case, an analytical optimal can be found, derived directly from marginal analysis as detailed in the newsvendor model (see, e.g., Wikipedia contributors, "Newsvendor Model," available online from wikipedia.org), as shown by the following equations:

$$c_e P[x \leq R] = c_s(1 - P[x \leq R])$$
$$P[x \leq R] = \frac{c_s}{c_e + c_s},$$

where $c_e$ is the cost of using excess of resources, Cs is the cost of using too little resources, and $P[x \leq R]$ is the probability of needing fewer than R amount of resources. If X is defined by an invertible probability density function, such as a Gaussian distribution, the critical k can be found using normal tables. Afterwards, the predictions 630 can be adjusted to match the inherent error distribution:

$$nP = P + k \cdot \sigma,$$

where nP is the new optimal prediction, P is the prediction made by the machine learning model and $\sigma$ is the standard deviation of the machine learning model error.

In one suitable exemplary implementation, a serverless computing service provider offers the execution of programs on specialized hardware. For example, HPC (high performance computing) execution on computer clusters with high quality graphics processing unit (GPU) boards. The provider manages the allocation of such resources, while pricing is based on the actual amount of resource consumed by the submitted jobs. Additionally, a hypothetical customer enters an SLA with the exemplary service provider specifying that the submitted executable jobs need to be completed within 24 hours. When the customer submits a new executable job, the service provider needs to decide how much of the infrastructure should be reserved for that job in order to satisfy the SLA. This is a hard problem, especially if that type of source code of the job has never been executed before.

The sole information the service provider has about the new job is the source code and corresponding input data. Thus, the service provider needs to extract relevant characteristics from them and find similarities from past experiences in order to make a performance approximation. This process is enabled by a trained machine learning model 550 of FIG. 5, trained with past executions of training source code 505. The service provider can use the trained machine learning model 550 to predict the required number of resources to execute the new job based on features from its source code and input data. Furthermore, the error margin of the model can be used to find resource allocation policies that could substantially maximize the profit of the service provider, while also satisfying the SLA metrics.

Pay-per-use models in computing environments allow for better resource usage and fairer pricing. However, from the service provider perspective, efficient resource allocation might be challenging. This is especially true for serverless computing environments, where the service provider needs to allocate the appropriate resources to run a job. Sometimes, the service provider can only access the source code of the job to make a performance approximation. On the occasion that there is a service level agreement between the customer and the service provider, several other requirements should also be taken into consideration.

Among other benefits, the disclosed resource allocation techniques allocate computing resources supported by source code feature extraction and machine learning. In one or more embodiments, the disclosed resource allocation techniques leverage well-known feature extraction techniques, such as natural language processing, pattern-based extraction and control-flow graph analysis.

One or more embodiments of the disclosure provide improved methods, apparatus and computer program products for allocation of shared computing resources. The foregoing applications and associated embodiments should be considered as illustrative only, and numerous other embodiments can be configured using the techniques disclosed herein, in a wide variety of different applications.

It should also be understood that the disclosed resource allocation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for shared computing resource allocation may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based resource allocation engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based resource allocation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
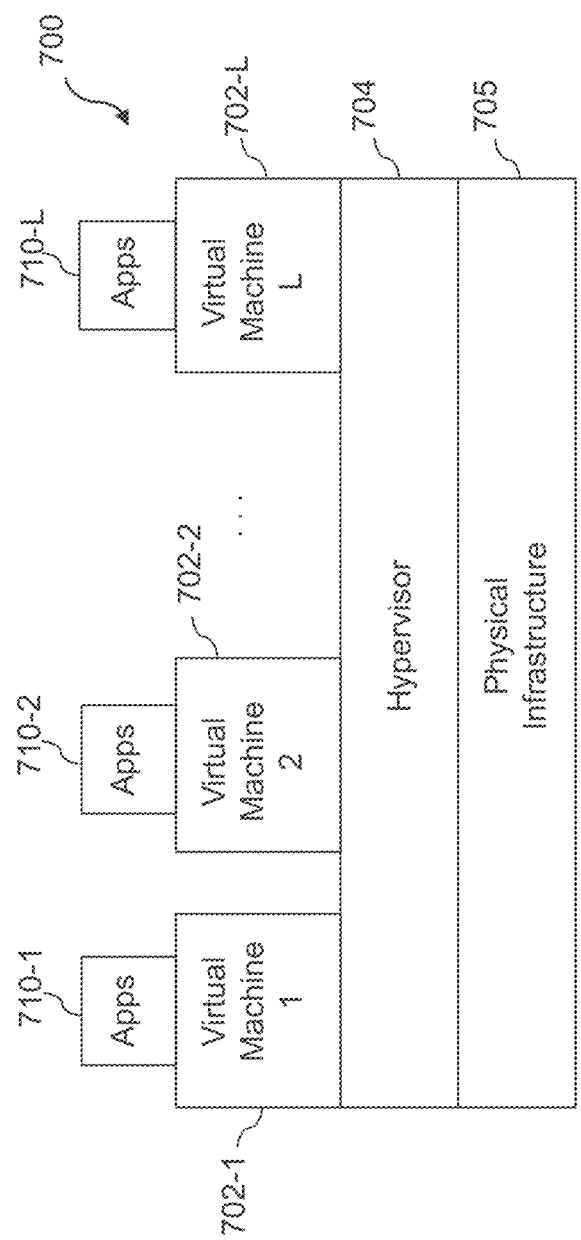
FIG. 7 illustrates an exemplary processing platform that may be used to implement at least a portion of one or more embodiments of the disclosure comprising a cloud infrastructure.

Referring now to FIG. 7, one possible processing platform that may be used to implement at least a portion of one or more embodiments of the disclosure comprises cloud infrastructure 700. The cloud infrastructure 700 in this exemplary processing platform comprises virtual machines (VMs) 702-1, 702-2, . . . 702-L implemented using a hypervisor 704. The hypervisor 704 runs on physical infrastructure 705. The cloud infrastructure 700 further comprises sets of applications 710-1, 710-2, . . . 710-L running on respective ones of the virtual machines 702-1, 702-2, . . . 702-L under the control of the hypervisor 704.

The cloud infrastructure 700 may encompass the entire given system or only portions of that given system, such as one or more of client, servers, controllers, or computing devices in the system.

Although only a single hypervisor 704 is shown in the embodiment of FIG. 7, the system may of course include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement hypervisor 704 and possibly other portions of the system in one or more embodiments of the disclosure is the VMware® vSphere™ which may have an associated virtual infrastructure management system, such as the VMware® vCenter™. As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC of Hopkinton, Mass. The underlying physical machines may comprise one or more distributed processing platforms that include storage products.

Particular types of storage products that can be used in implementing a given storage system of the cloud-based resource allocation engine in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

As is apparent from the above, one or more of the processing modules or other components of the disclosed cloud-based resource allocation apparatus may each run on a computer, server, storage device or other processing platform element. A given such element may be viewed as an example of what is more generally referred to herein as a "processing device." The cloud infrastructure 700 shown in FIG. 7 may represent at least a portion of one processing platform.

Figure 8:
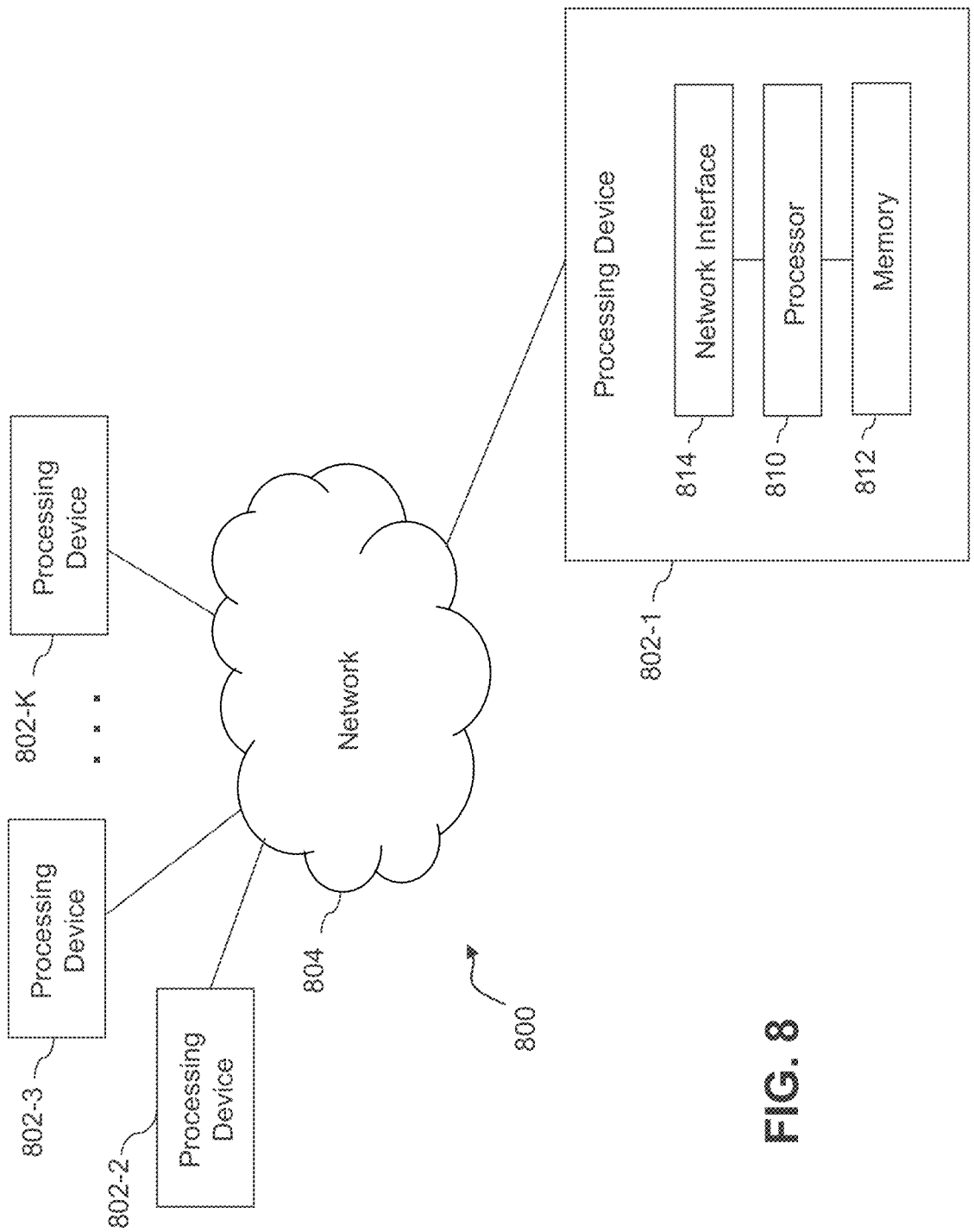
FIG. 8 illustrates another exemplary processing platform that may be used to implement at least a portion of one or more embodiments of the disclosure.

Another example of a processing platform is processing platform 800 shown in FIG. 8. The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an application specific integrated circuit (ASIC), a field programmable gate array (FPGA) or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining source code for execution in a shared computing environment;
extracting, using at least one processing device, a plurality of discriminative features from the source code;
obtaining, using the at least one processing device, at least one trained machine learning model; and
applying, using the at least one processing device, the plurality of extracted discriminative features to the at least one trained machine learning model, wherein the at least one trained machine learning model generates a prediction of an allocation comprising a required amount of one or more resources of the shared computing environment needed to satisfy one or more service level agreement requirements for the source code to be executed in the shared computing environment, and wherein the at least one trained machine learning model is trained using a set of discriminative features extracted from training source code and corresponding measurements of one or more metrics of the service level agreement requirements obtained by executing the training source code on a plurality of the resources of the shared computing environment.

2. The method of claim 1, further comprising generating one or more error boundaries of the predicted allocation of the one or more resources based on a standard deviation of the at least one machine learning model.

3. The method of claim 1, wherein the extracting the plurality of discriminative features from the source code employs one or more of natural language processing techniques, pattern-based techniques and worst-case execution time techniques.

4. The method of claim 3, wherein the natural language processing techniques extract one or more of the discriminative features from the source code based on a term frequency metric.

5. The method of claim 3, wherein the pattern-based techniques extract one or more of the discriminative features from the source code by identifying one or more patterns in function calls of the source code.

6. The method of claim 3, wherein the worst-case execution time techniques extract one or more of the discriminative features from the source code by obtaining statistics regarding execution times for each type of task in the source code.

7. The method of claim 1, further comprising estimating an amount of time required to process the source code until a completion of the execution of the source code.

8. A system, comprising:
a memory; and
at least one processing device, coupled to the memory, operative to implement the following steps:
obtaining source code for execution in a shared computing environment;
extracting, using at least one processing device, a plurality of discriminative features from the source code;
obtaining, using the at least one processing device, at least one trained machine learning model; and
applying, using the at least one processing device, the plurality of extracted discriminative features to the at least one trained machine learning model, wherein the at least one trained machine learning model generates a prediction of an allocation comprising a required amount of one or more resources of the shared computing environment needed to satisfy one or more service level agreement requirements for the source code to be executed in the shared computing environment, and wherein the at least one trained machine learning model is trained using a set of discriminative features extracted from training source code and corresponding measurements of one or more metrics of the service level agreement requirements obtained by executing the training source code on a plurality of the resources of the shared computing environment.

9. The system of claim 8, further comprising the step of generating one or more error boundaries of the predicted allocation of the one or more resources based on a standard deviation of the at least one machine learning model.

10. The system of claim 8, wherein the step of extracting the plurality of discriminative features from the source code employs one or more of natural language processing techniques, pattern-based techniques and worst-case execution time techniques.

11. The system of claim 10, wherein the natural language processing techniques extract one or more of the discriminative features from the source code based on a term frequency metric.

12. The system of claim 10, wherein the pattern-based techniques extract one or more of the discriminative features from the source code by identifying one or more patterns in function calls of the source code.

13. The system of claim 10, wherein the worst-case execution time techniques extract one or more of the discriminative features from the source code by obtaining statistics regarding execution times for each type of task in the source code.

14. The system of claim 8, further comprising estimating an amount of time required to process the source code until a completion of the execution of the source code.

15. A computer program product, comprising a tangible machine-readable storage medium having encoded therein executable code of one or more software programs, wherein the one or more software programs when executed by at least one processing device perform the following steps:
obtaining source code for execution in a shared computing environment;
extracting, using at least one processing device, a plurality of discriminative features from the source code;
obtaining, using the at least one processing device, at least one trained machine learning model; and
applying, using the at least one processing device, the plurality of extracted discriminative features to the at least one trained machine learning model, wherein the at least one trained machine learning model generates a prediction of an allocation comprising a required amount of one or more resources of the shared computing environment needed to satisfy one or more service level agreement requirements for the source code to be executed in the shared computing environment, and wherein the at least one trained machine learning model is trained using a set of discriminative features extracted from training source code and corresponding measurements of one or more metrics of the service level agreement requirements obtained by executing the training source code on a plurality of the resources of the shared computing environment.

16. The computer program product of claim 15, further comprising the step of generating one or more error boundaries of the predicted allocation of the one or more resources based on a standard deviation of the at least one machine learning model.

17. The computer program product of claim 15, wherein the step of extracting the plurality of discriminative features from the source code employs one or more of natural language processing techniques, pattern-based techniques and worst-case execution time techniques.

18. The computer program product of claim 17, wherein the natural language processing techniques extract one or more of the discriminative features from the source code based on a term frequency metric.

19. The computer program product of claim 17, wherein the pattern-based techniques extract one or more of the discriminative features from the source code by identifying one or more patterns in function calls of the source code.

20. The computer program product of claim 15, further comprising estimating an amount of time required to process the source code until a completion of the execution of the source code.

* * * * *